United States Patent Office 3,629,162
Patented Dec. 21, 1971

1

3,629,162
POLYURETHANE FOAMS AND
PREPARATION OF SAME
Thomas Richardson and Gerald Orton Hustad, Madison, Wis., assignors to Wisconsin Alumni Research Foundation, Madison, Wis.
No Drawing. Filed Feb. 3, 1970, Ser. No. 8,438
Int. Cl. C08g 22/44; C08h 1/00
U.S. Cl. 260—2.5                                16 Claims

ABSTRACT OF THE DISCLOSURE

Polyurethane foams and method for their preparation wherein an organic polyisocyanate is reacted for foaming with a mixture of an organic polyol and whey.

---

This invention relates to foamed polyurethanes and to a new and less expensive composition for use in the manufacture of same.

Foamed polyurethane plastics are generally prepared by the reaction of an organic polyol, polyether polyol or polyhydroxy polyester with a reactive organic polyisocyanate. The principal reaction involved is that which occurs between the polyisocyanate and the polyhydroxylated compound to yield a polyurethane polymer. The primary ingredients can be partially polymerized to a prepolymer with one of the ingredients present in an insufficient amount and which is later added with catalyst, foaming agent and surfactant to produce a foamed product, or the reaction can be carried out as a "one shot" technique wherein all of the ingredients are brought together simultaneously. The heat generated by the exothermic polymerization reaction causes the foaming agent, when present in the form of a low boiling hydrocarbon such as Freon, to vaporize whereby the vapors become entrapped to form the cellular structure. In accordance with a further technique, the mixture can be foamed by vigorous agitation to incorporate air into the polymeric system.

Generally speaking, there are a number of deficiencies which, when overcome, would enhance the acceptance of polyurethane foamed plastics and enable more widespread use to be made thereof. One of the present drawbacks is the high cost of the raw materials which make up the foamed product, and another is the inability of many of the polyurethane foams to be non-burning without incorporation of foreign materials such as phosphorus compounds.

One of the best and more common approaches in reducing the cost of polyurethane foams is by the use of extenders. A wide variety of such extenders has been proposed including wood resins, starch and gum dextrin, but none has provided an acceptable balance of flame resistance and various other favorable properties such as cellular structure.

It is accordingly an object of the present invention to provide a polyurethane foam which is formulated of less expensive materials and which has enhanced flame retardant properties and improved texture.

These and other objects and advantages of the present invention will appear hereinafter, and it will be understood that examples are included by way of illustration, and not by way of limitation.

2

In our copending application, Ser. No. 847,401, filed Aug. 4, 1969, and entitled "Polyurethane Foams and Composition," description is made of a new and less expensive foamed polyurethane prepared by the reaction of a polyisocyanate with a whey powder, such as sweet whey or acid whey, in suspension in a solution of dimethylsulfoxide, optionally in the presence of a catalyst. Foamed polyurethane prepared in this manner is self-extinguishing from the standpoint of flame resistance and has good foaming characteristics.

It has now been found that wheys of the type used in the aforementioned copending application may be advantageously employed in the preparation of conventional polyurethane foams wherein an organic polyisocyanate is reacted with whey and an organic polyhydroxylated compound in the presence of a catalyst. Polyurethane foams prepared in accordance with the concept of the present invention have been found to possess improved flame retardant properties while being consistently less expensive than conventional polyurethanes prepared without whey.

Since whey contains about 60–75% lactose, the whey serves both as an extender and as a substitute in part for the polyol. Thus, in addition to the foregoing advantages, the polyurethane foams prepared in accordance with the present invention have good texture and good cellular characteristics.

Representative of the whey powders that can be used in the practice of this invention are the sweet whey powders from Cheddar, Swiss or Blue Cheese, or acid whey powders from cheeses, such as cottage cheese.

|  | Acid whey powder, percent | Sweet whey powder 1, percent | Sweet whey powder 2, percent |
|---|---|---|---|
| Lactose | 65.0 | 71.2 | 72.4 |
| Protein | 12.0 | 12.9 | 12.5 |
| Lactic acid | 6.0 | 2.3 |  |
| Fat |  | 1.1 | 1.2 |
| Water | 2.5 | 4.5 | 6.2 |
| Ash | Present | 8.0 | 7.7 |
| Ca | Present | Present | 0.68 |
| P | Present | Present | 0.58 |
| Vit.B complexes | Present | Present | Present |

Any of the organic polyisocyanates conventionally employed in the manufacture of polyurethanes can be used in the practice of the present invention. Illustrative are aliphatic polyisocyanate as represented by hexylethylenediisocyanate or aromatic polyisocyanates such as 2,4 - toluenediisocyanate, 2,6-toluenediisocyanates and mixtures thereof. The particular polyisocyanate selected will depend somewhat upon its reaction rate in the reaction system and the properties desired in the final product.

However, in the practice of the present invention, it is frequently preferred to make use of one of a mixture of aromatic polyisocyanates because of their higher reaction rates. Best use is made of 2,4-tolylene diisocyanate and 2,6-tolylene diisocyanate or mixtures thereof (known in the art as TDI) or polymethylene polyphenylisocyanate (known in the art as PAPI).

Similarly, polyhydroxylated compounds employed in the present application may be any of a wide variety of polyhydroxylated compounds conventionally employed for reaction with polyisocyanates in the manufacture of polyurethanes. Illustrative of these organic polyols are glycerol, trimethylol propane, butylene glycol and polyether polyols which include polyalkylene glycols such as polyethylene glycol, polypropylene glycol or polybutylene glycol, and polyhydroxy polyesters, such as the reaction products of a polyhydric alcohol (i.e. glycol, ethylene glycol, propylene glycol) with a polycarboxylic acid, or anhydride, adipic acid, succinic acid, malonic acid, maleic acid, anhydride and the like. Mixtures of polyols may be used. The polyhydroxylated compounds used generally have an OH index within the range of 400-500 and use may be made of this range in the practice of the present invention. However, it has been found that polyols having hydroxyl numbers greater than 500 (such as those having hydroxyl numbers ranging from 700–800) yield whey-extended foams with higher compressive strengths.

The proportions in which the polyisocyanate, the polyhydroxylated compound and the whey are reacted are not critical, although it is generally preferred to formulate the reaction mixture to contain between 10 to 150 parts by weight of the polyhydroxylated compound for each 100 parts by weight of the polyisocyanate. The amount of whey employed depends to a large extent upon the properties desired in the foamed product. It has been found that fire retardant properties of polyurethane foams prepared in accordance with the practice of the invention are more evident with increasing amounts of whey up to an amount corresponding to 80% by weight of the polyhydroxylated compound present. At this point the viscosity of the polyol or polyether polyol becomes very great so that this criterion alone determines to what extent a rigid foam can be further extended with whey. However, it has been found that the Freon blowing agents aid in reducing the polyol viscosity when added in amounts in excess of the conventional ranges, although large excesses of the Freons result in longer rise times since the Freon operates to cool the polymerization reaction.

In general, it is preferred to formulate the reaction mixture to contain between 0.1 to 80 parts by weight whey for each 100 parts by weight of the polyisocyanate. Amounts of whey greater than 50 parts by weight per 100 parts by weight of polyisocyanate generally provide a foamed product having lower compression strength which may advantageously be used in packaging application where good shock absorption is required.

Catalysts for use in the process of the present invention may be the conventional catalysts normally employed in the production of polyurethane foams, such as the organo tin compounds and/or the tertiary amine catalysts. The tertiary amines are generally highly selective in accelerating the water-isocyanate reaction to produce carbon dioxide as a foaming agent in the reaction. On the other hand, the organo tin compounds generally promote the polymerization reaction but exhibit low orders of activity in evolution of carbon dioxide from the isocyanate. Thus, the tertiary amines and other catalysts which accelerate the water-isocyanate reaction are favored when water is being relied upon to generate carbon dioxide as blowing agent, while the organo tin catalysts are effective where fast polymerization is desirable.

The organo tin catalyst used most frequently in this invention is a tetravalent organo tin compound marketed under the designation Carstan T–52N–50 by Carlisle Chemical Works. This catalyst is unusual in that it tends to accelerate the water-isocyanate reaction and at the same time increases in activity as the temperature increases. This compound is characterized by stability to hydrolysis with the result that pre-mixes enjoy longer shelf life. Other organo tin catalysts which can be used are represented by stannous octoate and dibutyl tin dilaurate. Representative of the tertiary amine catalysts are tetramethylbutanediamine and triethylenediamine. Successful use has been made of a tertiary amine catalyst marketed under the name Dabco 33–LV (available from Houdry Process Co., Chicago, Ill.).

In the practice of the present invention, use is made of the catalyst of the type described in an amount within the range of 0.1 to 10 parts by weight of catalyst per 100 parts by weight of whey powder, and preferred in an amount within the range of 0.5 to 5 parts by weight catalyst per 100 parts by weight of whey powder plus polyol.

Generation of a foam in the production of a foamed polyurethane may be effected in a conventional manner, as by vigorous agitation during reaction to incorporate air which becomes entrapped in the cured resin to define the porosity therein, or by the incorporation of a low boiling hydrocarbon liquid that is readily vaporized at reaction temperature to produce vapors which become entrapped in the resin forming ingredients to define the porosity, as by the introduction of a small amount of a low boiling fluorocarbon such as the Freon liquids manufactured by the DuPont Company. It is also possible to rely upon the development of porosity by the generation of carbon dioxide in response to the reaction between water and isocyanate groups of the polyisocyanate since water is inherently present in the whey powder in uniform distribution throughout the whey and somewhat in the most desirable amounts. The optimum amount of water for use in the generation of carbon dioxide as a blowing agent with PAPI is about 7 to 8% based upon the weight of the whey powder plus polyol to produce foams with a density of approximately 2 pounds per cubic foot.

Since the amount of water inherently present in dry whey powders generally ranges between 2% to 7% by weight, additional water needed for incorporation into the mix will depend upon how much whey is added as an extender. Thus, blowing can be effected without adding low boiling hydrocarbons. The uniform distribution of water inherently present in the whey powder favors the distribution of the pores throughout the cross section of the foamed product.

In order to insure the desired cellular structure, it is desirable to include in the reaction mixture a surfactant or other cell-control agent, such as polyglycol silicon polymers which must be added in sufficient quantities to control cell formation and texture. It is frequently preferred to employ surfactant L5410, which is a rigid foam surfactant marketed by the Freeman Chemical Company.

It will be seen from the analysis of the powdered whey that the whey contains lactose and protein as the principal ingredients with the amount varying, depending somewhat upon the source of the whey and its method of preparation. The protein content of whey will vary usually within the range of 8% to 14% of the whey. The presence of the protein with the lactose, in the described amounts, has been found to produce foamed polyurethanes in which the foam itself along with the outer skin is not friable and in which the foamed product is more coadhesive and is characterized by a more uniform cellular structure in comparison to foams made with pure lactose, with no protein present. It is believed that the amino groups present in the whey proteins enter into the reaction with isocyanate groups of the polyisocyanate to provide additional crosslinking in the foamed polyurethane which seems to improve coadhesive strength and cell structure and reduce friability of the foam itself along with the outer surface of the foamed product. It will be understood that modification of the whey by adding lactose or by adding protein can be achieved to vary the ratio of protein to lactose in the reactive composition. However, it is undesirable to make use of a composition containing total protein in an amount less than 4% by weight or more than 20% by weight of the lactose-protein combination. In the preferred practice, the protein is employed in the amount that is naturally found in the whey powder or in an amount within the range of 8% to 14% by weight.

The calcium and phosphorus compounds, which comprise the principal components of the high ash present in whey powder and their particular tie-in with the polyurethane foam that is formed by reaction between the whey and polyisocyanate, is believed, at least in part, to be responsible for the novel, unexpected and enhanced flame retardant properties of the foamed polyurethane formed by the practice of this invention.

While lactose represents the preferred sugar employed in combination with the protein, or added to the dry whey, as previously described, other sugars such as dextrose, maltose and sucrose can be substituted in whole or in part for the lactose in equivalent amounts.

When formulated of lactose and a protein, the amount of protein in the reaction mixture can be above that naturally present in the whey powder such that it is possible to formulate for an amount of protein in the combined mixture of lactose and protein within the range of 4 to 20% by weight of protein but with best results being obtained when the protein is present within the range of 8 to 14% by weight, as in natural whey powders.

In the formulations described, finely divided pigment and fillers such as calcium carbonate, calcium sulphate, calcium oxide, aluminum powder, aluminum oxide, carbon black and the like can be incorporated for special applications of foamed polyurethanes produced in accordance with the practice of this invention. Similarly, glass fibers in amounts up to 5% by weight can be introduced to impart strength and toughness to the foamed polyurethane. Such glass fibers are beneficial in the foamed product by their highly hydrophilic surfaces which enhance the distribution of carbon dioxide generated by moisture on the glass fiber surfaces to improve the formation and distribution of pores. By reason of the hydrophilic groups predominating on the glass fiber surfaces, a strong interbonded relationship can be established between the glass fibers and the cured resinous materials.

Having described the basic concepts of this invention, illustration will now be made by way of the following examples which are given by way of illustration, but not by way of limitation.

EXAMPLES 1 TO 3

Three foams having the compositions tabulated in Table I were prepared by mixing propoxylated sorbitol having a hydroxyl number of 490 with whey powder, and then adding the catalyst, surfactant and water (as the blowing agent). The ingredients were stirred until thoroughly mixed and polymethylene polyphenylisocyanate was added, followed by stirring for one minute.

The mixture was then poured into a one-half gallon paper carton and allowed to rise. The formulations and foaming characteristics are shown in the following table. All quantities are parts by weight.

TABLE I

| Example | 1 | 2 | 3 |
|---|---|---|---|
| Components: | | | |
| Propoxylated sorbitol (OH=490) | 40 | 40 | 40 |
| Dried whey (6.5% by wt. H₂O) | 0 | 10 | 20 |
| PAPI | 49 | 49 | 49 |
| Dabco 33LV | 0.4 | 0.4 | 0.4 |
| Tetramethyl guanidine | 0.28 | 0.28 | 0.28 |
| Surfactant L5410 | 0.44 | 1.3 | 1.7 |
| Water | 3.0 | 3.0 | 3.0 |
| Foaming characteristics: | | | |
| Stirring time (seconds) | 60 | 60 | 60 |
| Rise time (seconds) | 70 | 150 | 240 |
| Tack-free time (seconds) | 120 | 240 | 540 |

The foams produced in Examples 2 and 3 had excellent textures, and also had lower compressive strength as compared to the foam prepared in Example 1 in which no whey was employed.

EXAMPLES 4 TO 8

These examples illustrate the use of fluorotrichloromethane (Freon 11) as the blowing agent. The same procedure described in Examples 1 to 3 was employed except that the water blowing agent was replaced by Freon. The foam formulations and their foaming characteristics are shown in Table II, with all quantities being given in parts by weight.

TABLE II

| Example | 4 | 5 | 6 | 7 | 8 |
|---|---|---|---|---|---|
| Components: | | | | | |
| Dried whey (6.5% by wt. H₂O) | 0 | 10 | 20 | 30 | 40 |
| Propoxylated sorbitol (OH=490) | 40 | 40 | 30 | 20 | 10 |
| PAPI | 49 | 49 | 49 | 49 | 49 |
| Dabco 33LV | 0.4 | 0.4 | 0.4 | 0.4 | 0.4 |
| Tetramethyl guanidine | 0.28 | 0.28 | 0.28 | 0.28 | 0.28 |
| Fluorotrichloromethane (F-11) | 15.5 | 15.5 | 17 | 17 | 25 |
| Surfactant L5410 | 0.44 | 1.3 | 1.7 | 1.7 | 2.1 |
| Foaming characteristics: | | | | | |
| Stirring time (seconds) | 60 | 60 | 60 | 60 | 120 |
| Rise time (seconds) | 120 | 360 | 300 | 300 | 600 |
| Tack-free time (seconds) | 180 | 450 | 420 | 420 | 600 |

The foams of Examples 5 to 8 were found to have excellent texture, though less compression resistance as compared to the foam of Example 4. The compression strength was found to decrease with increasing amounts of whey.

It will be apparent from the foregoing that there is provided a new and improved composition for the manufacture of foamed polyurethane plastics which are characterized by low cost, low compressive strength, uniform cellular structure and fire retardant properties.

It will be understood that various changes may be made in the details of formulation and processing without departing from the spirit of the invention, especially as defined in the following claims.

We claim:
1. In a polyurethane foam prepared by reacting an organic polyisocyanate with an organic polyhydroxylated compound, wherein the improvement comprises reacting the organic polyisocyanate and the organic polyhydroxylated compound in the presence of a sugar selected from the group consisting of lactose, dextrose, maltose, sucrose and mixtures thereof and whey protein, and foaming the reaction mixture during polymerization in the presence of a surfactant to produce a foamed polyurethane.

2. A polyurethane as defined in claim 1 wherein said protein comprises 4 to 20% by weight of the total weight of said sugar and said protein.

3. A polyurethane as defined in claim 1 wherein said protein comprises 8 to 14% by weight of the total weight of said sugar and said protein.

4. A polyurethane as defined in claim 1 wherein said sugar is lactose.

5. A polyurethane as defined in claim 1 wherein the combined sugar and protein constitutes 0.1 to 80 parts by weight per 100 parts by weight of said polyisocyanate.

6. A polyurethane as defined in claim 1 wherein said polyhydroxylated compound constitutes 10 to 150 parts by weight per 100 parts by weight of said polyisocyanate.

7. A polyurethane as defined in claim 1 wherein said formulation has an isocyanate index of less than 105.

8. A polyurethane as defined in claim 1 wherein said formulation has an isocyanate index within the range of 35 to 105.

9. A polyurethane as defined in claim 1 wherein said polyhydroxylated compound has a hydroxyl number of about 300 to 800.

10. A polyurethane as defined in claim 1 wherein said polyhydroxylated compound is selected from the group consisting of polyether polyols and polyhydroxy polyesters.

11. A polyurethane as defined in claim 1 wherein said polyisocyanate is polymethylene polyphenylisocyanate.

12. A polyurethane as defined in claim 1 wherein the reaction is carried out in the presence of a catalyst.

13. A polyurethane as defined in claim 12 wherein said catalyst is selected from the group consisting of an organo tin catalyst, a tertiary amine catalyst and mixtures thereof.

14. A polyurethane as defined in claim 1 wherein the reaction mixture is foamed by adding a blowing agent to the reaction mixture.

15. A polyurethane as defined in claim 1 wherein the reaction mixture contains water in an amount within the range of 2 to 13% by weight of the combined sugar and protein whereby the water reacts with the polyisocyanate to form carbon dioxide in situ.

16. A polyurethane as defined in claim 1 wherein said sugar and said protein are present in the foam of whey.

References Cited

UNITED STATES PATENTS 3,075,930   1/1963   Stewart _____ 260—2.5

OTHER REFERENCES

Bennett, "Rigid Urethane Foam Extended with Starch" Journal of Cellular Plastics, August 1967, pages 369–373.

Einhorn, "Extended Foams", Journal of Cellular Plastics, January 1965, pages 25 to 31.

DONALD E. CZAJA, Primary Examiner

C. WARREN IVY, Assistant Examiner

U.S. Cl. X.R.

260—2.5 AN, 2.5 AS, 2.5 AP, 2.5 AZ, 2.5 AJ